Oct. 10, 1933.  C. A. CAMPBELL  1,929,575
AIR BRAKE
Filed Oct. 26, 1932   2 Sheets-Sheet 1
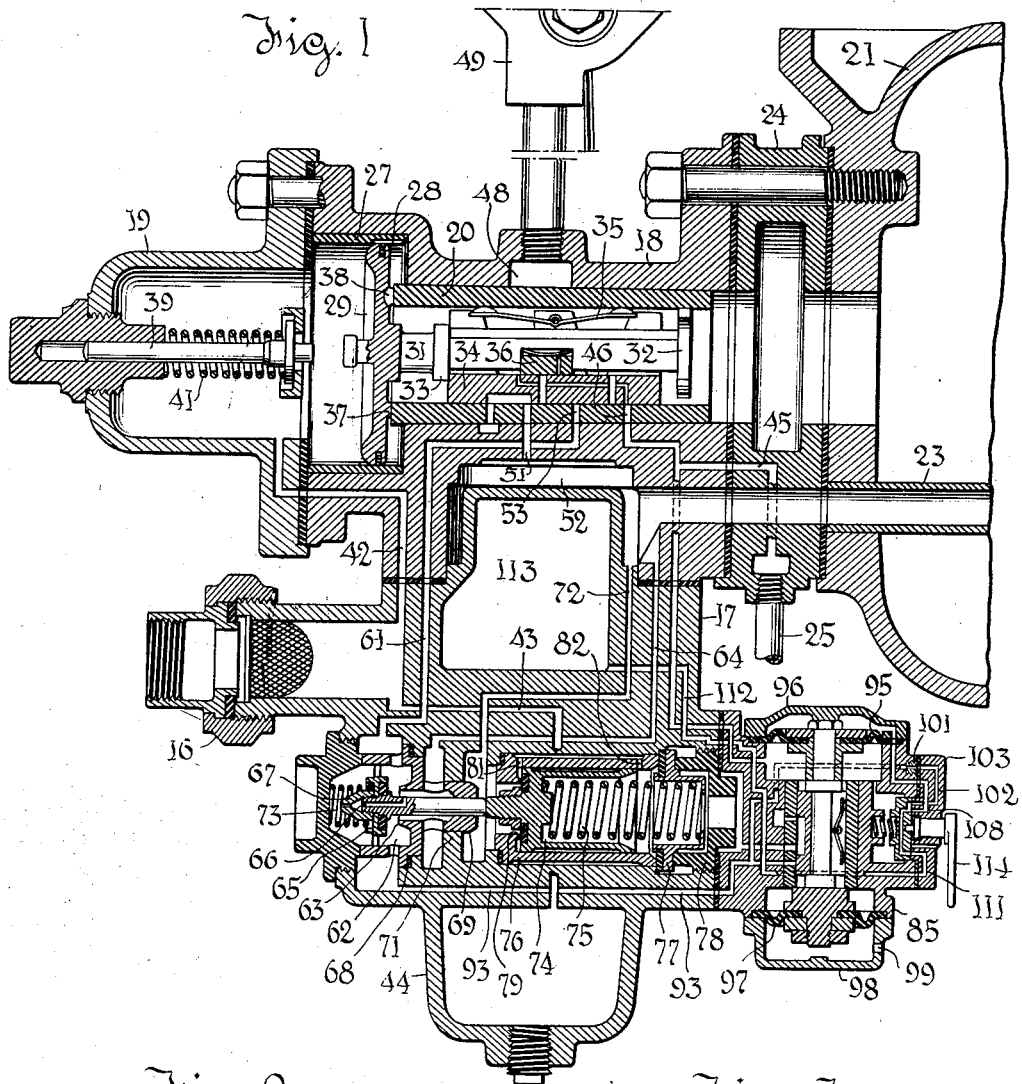
Fig. 1
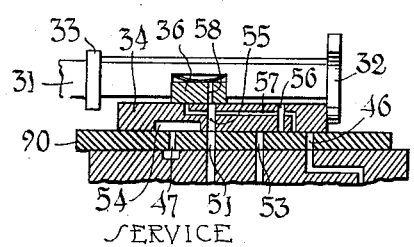
Fig. 2  SERVICE
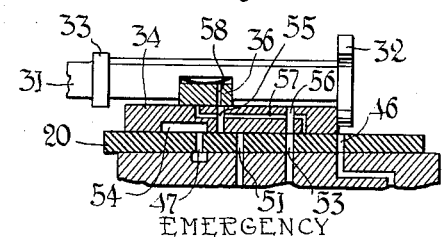
Fig. 3  EMERGENCY
Inventor
Charles A. Campbell
By
Attorneys Oct. 10, 1933.  C. A. CAMPBELL  1,929,575
AIR BRAKE
Filed Oct. 26, 1932  2 Sheets-Sheet 2
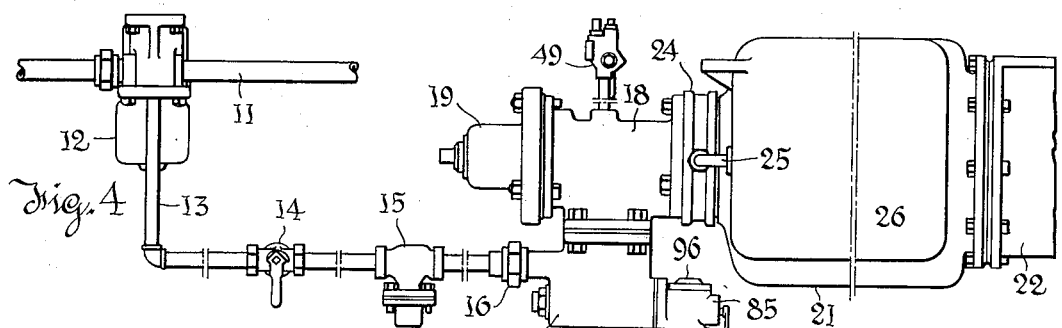
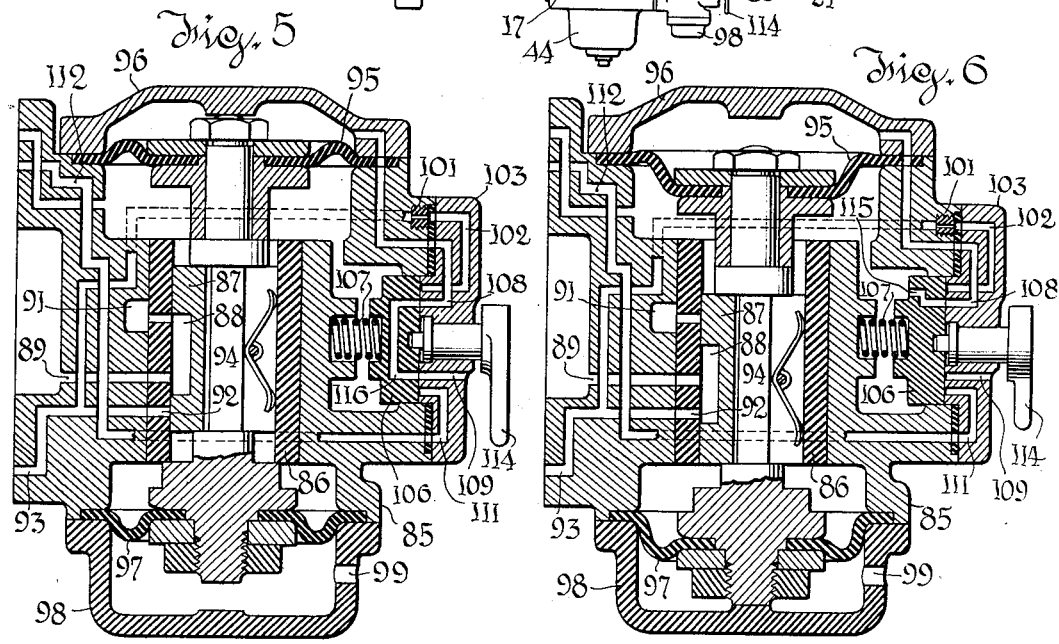
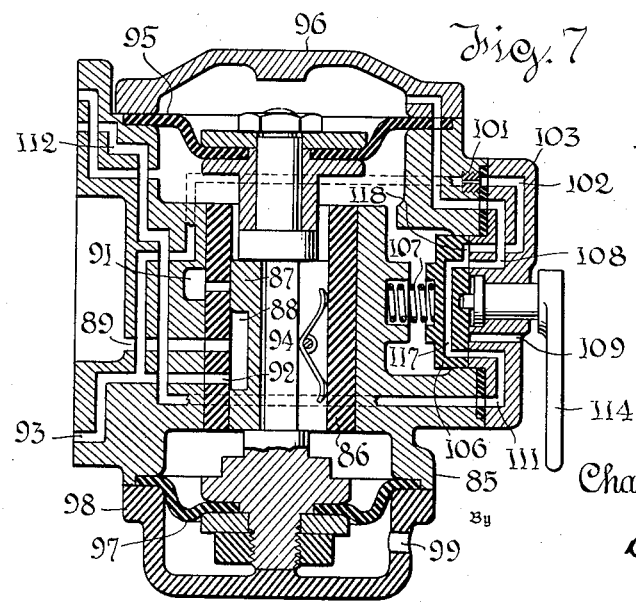
Inventor
Charles A. Campbell
By
Attorneys Patented Oct. 10, 1933

1,929,575

UNITED STATES PATENT OFFICE 1,929,575

AIR BRAKE

Charles A. Campbell, Watertown, N. Y., assignor to The New York Air Brake Company, a corporation of New Jersey Application October 26, 1932. Serial No. 639,707

11 Claims. (Cl. 303—35)

This invention relates to air brakes, and particularly to a mechanism intended to be interposed in the path of flow of air from the triple valve to the brake cylinder and serving to control the rate of development of brake cylinder pressure.

The mechanism is so contrived that it may be given three characteristically different settings. In one setting the brake cylinder pressure is allowed to build up rapidly without any secondary control. This is called single stage build up. In another setting the brake cylinder pressure builds up rapidly until a moderate brake cylinder pressure is developed, after which the development of brake cylinder pressure continues at a restricted rate. This will be referred to as two stage build up. In the third setting of the device brake cylinder pressure will rise first quite rapidly, as in two stage operation, and then will increase at a relatively slow rate for a definite time period, and at the termination of such time period will again build up rapidly. This will be referred to as three stage operation.

The device may be applied to any form of triple valve, but will be described as combined with a very simple triple valve designed to deliver air from the auxiliary reservoir to the brake cylinder in service applications and to deliver air from an auxiliary reservoir and a supplemental reservoir in emergency applications.

The valve chosen for illustration does not include any quick service venting feature, but this may readily be incorporated, if desired.

The triple valve is intended for use in conjunction with a separate emergency brake pipe vent valve, and consequently does not include emergency venting features. It is not deemed necessary to illustrate the emergency vent valves, as valves of this character are well known in the art.

Referring now to the drawings,—

Fig. 1 is a vertical axial section through a triple valve equipped with the invention. The view is diagrammatic to the extent that the ports are shown as if they all lay in a single plane, the purpose being to permit concurrent flows to be traced on a single view. The parts are shown in release position.

Fig. 2 is a fragmentary view showing the slide valve and graduating valve of Fig. 1 in service position.

Fig. 3 is a similar view showing the parts in emergency position.

Fig. 4 is an elevation showing the triple valve and its related mechanism connected to brake pipe, emergency vent valve, auxiliary reservoir, brake cylinder, and supplemental reservoir.

Fig. 5 is a fragmentary view on an enlarged scale showing the stage control mechanism forming a part of Fig. 1, set for two stage operation.

Fig. 6 is a similar view showing the mechanism set for single stage operation.

Fig. 7 is a similar view showing the mechanism set for three stage operation.

In Fig. 4, the brake pipe is shown at 11, and a portion of the emergency brake pipe vent valve at 12. A branch pipe 13 leads from the brake pipe to the triple valve, there being interposed in the branch pipe 13 a cut-out cock 14 and a dust collector 15. The branch pipe is connected at 16 by means of the usual union with the lower case 17 of the triple valve. The body of the triple valve is illustrated at 18, the front cap at 19, and the auxiliary reservoir at 21. The brake cylinder 22 is mounted on the forward end of the auxiliary reservoir 21 and connection from the triple valve to the brake cylinder is made by way of the brake cylinder pipe 23 which extends through the reservoir from a mounting face on the rear of the reservoir. Seated on this mounting face, and interposed between the auxiliary reservoir and the triple valve, is a filler piece 24, which affords connection for a branch pipe 25 leading to the supplemental reservoir 26. The auxiliary reservoir, triple valve body, and filler piece, are connected by studs, as shown. The front cap and lower case are bolted to the body, as is clearly indicated in the drawings. The customary ported gaskets are used to secure tight joints.

The filler piece 24 is provided with a central aperture which aligns with the opening in the end of the auxiliary reservoir and connects the auxiliary reservoir with the slide valve chamber within the bushing 20. There is also a cylinder bushing 27 with charging groove 28. The triple piston 29 works in the bushing 27 and has a stem 31 with guiding spider 32 and collar 33. Between the spider 32 and collar 33 a slide valve 34 is confined, but is allowed limited lost motion. It is held to its seat by the usual bow spring 35 and carries on its upper face a graduating valve 36 which is closely confined in a notch in the stem 31 and is held seated by a small leaf spring, clearly shown in the drawings. Inward motion of the piston 29 is limited by collision of the rib 37 with the end of the bushing 26, at which time charging flow occurs through the slot 38. Front cap 19 carries a graduating stem 39 with graduating spring 41 and these perform the usual function of arresting the triple piston in service position and yielding to permit it to move in emergency position. In emergency position the piston seats on the front cap gasket as usual. The brake pipe connection 16 leads by way of passage 42 to the space to the left of piston 29 and by passage 43 to a drain cup 44. The supplemental reservoir pipe 25 leads by way of passage 45 to a supplemental reservoir port 46, in the seat for slide valve 34. In this seat there is an exhaust port 47 which leads by passage 48 to the usual retainer 49.

There is a brake cylinder port 51 used for flow to the brake cylinder in service and for exhaust flow in release. This port connects directly with the space 52 which is in direct communication with the brake cylinder pipe 23. Consequently flow in service and in release to and from this brake cylinder is not controlled by the delay build up mechanism hereinafter described. While it is not imperatively necessary that the control be limited to emergency applications, it derives its greatest importance in emergency applications, and opportunity has been taken to show that by using a separate port for emergency flow, the delay build up action may be restricted to emergency applications.

The emergency brake cylinder port is shown at 53 and leads through the build up delay mechanism mounted in the lower case, and hereinafter described. Slide valve 34 is provided with an exhaust cavity 54 which in release connects the ports 51 and 47. The valve 34 is also provided with a service port 55 which leads through the valve from top to bottom. In service position the port 55 registers with port 51. There is an emergency port 56 which extends through the valve 34 from top to bottom. In emergency position this registers with emergency port 53 in the seat. The port 56 is not controlled by the graduating valve 36 under any circumstances. There is a charging port 57 which extends from top to bottom of the slide valve 34. In release position this registers with the supplemental reservoir port 46 and provides for charging of the supplemental reservoir. The ports 55 and 57 are controlled by the graduating valve 36. In release position the valve exposes the upper end of port 57 and closes the port on start to service. The valve 36 controls the service port 55 by means of a through port 58. In service position port 58 aligns with port 55 and permits service flow. On motion of the piston to the right, the graduating valve laps port 55. This is a familiar function.

In release, charging flow occurs through the groove 28 and slot 38 from the brake pipe to the slide valve chamber. The slide valve chamber is in direct communication with the auxiliary reservoir. There is also a somewhat restricted connection with the supplemental reservoir by way of ports 57 and 46. While recharging occurs the brake cylinder is exhausted by way of pipe 23, chamber 52, port 51, cavity 54 and exhaust port 47.

In service position the exhaust port is closed, the supplemental reservoir port 46 is blanked, and service flow occurs from the auxiliary reservoir through passage 58, port 55, port 51, chamber 52 and pipe 23.

In emergency application the exhaust is still cut off. Supplemental reservoir air enters the slide valve chamber through port 46 which is exposed by the slide valve 34, and flows thence, together with auxiliary reservoir air, through port 56 and port 53. Port 53 leads by way of passage 61 to the delay build up mechanism 80 now to be described.

The port 61 leads to a chamber 62 and thence through valve seat 63 and passage 64 to the brake cylinder pipe 23. The rate of flow from passage 61 to passage 64 is controlled by a valve 65 which closes against seat 63, and which has a through port 66. The rate of flow through the port 66 is controlled by a choke port in the removable and interchangeable cap 67 which is threaded on the valve stem. The seat 63 is formed on a removable bushing which seals at 68 on a gasketed seat provided for it in the lower case 17, and which has a hub-like extension 69 which fits fairly closely in a partition 71. The space to the right of the partition 71 is connected with the brake cylinder pipe 23 by a passage 72. The purpose of the partition 71 is to protect the change over piston, hereinafter described, from the rush of air flowing through the valve seat 63 in emergency. It is not essential that the hub 69 fit snugly in the opening in partition 71.

The valve 65 is urged in a closing direction by a coil compression spring 73 and initially is held open by the change over piston 74 which is urged to the left by compression spring 75. The change over piston 74 works in a bushing 76 which is clamped in sealing relation with the end of a cavity formed to receive it in the lower case 17. The bushing is held by a follower 77 which in turn is pressed to place by an annular plug 78 threaded into the lower case 17.

When the change over piston 74 is at the left, it engages the stem of the valve 65 and holds the valve open. When the change over piston 74 moves to the right it allows the valve 65 to close against its seat, at which time the flow to the brake cylinder is limited to the capacity of the choke in cap 67. In its left hand, valve opening position the change over piston 74 seals by means of a gasket against rim 79 which reduces the effective area of the left hand end of the piston subject to brake cylinder pressure arriving through passage 72. At such time the space outside the rim 79 is vented to atmosphere through ports 81, 82, which are in communication with each other through the space surrounding bushing 76 and which straddle the ends of the piston 74. As soon as the piston starts to the right, port 82 is blanked and the whole area of the piston is subject to brake cylinder pressure, so that the piston moves suddenly to its right hand limit of motion, in which position it seals against a gasket, clearly shown in the drawings as interposed between the end of bushing 76 and the follower member 77.

If the right hand side of piston 74 is subject to brake cylinder pressure, this pressure, plus the pressure of spring 75, will hold the piston 74 to the left. If the space to the right of piston 74 is subject to atmospheric pressure, the piston 74 will move to the right when brake cylinder pressure rises a definite amount above atmospheric pressure. These characteristics are availed of to control the brake cylinder build up.

For single stage operation the piston 74 is subject on its right hand side to the full pressure flowing to the brake cylinder. For two stage operation the space to the right of the cylinder 74 is connected continuously to atmosphere. For three stage operation, the space to the right of the piston is first connected to atmosphere, during which time it goes through the first and second stages, and then after a definite time interval is subjected to the pressure flowing to the brake cylinder so it is shifted to the left, initiating the third stage.

A housing 85 is bolted to the lower case 17 and is provided with a valve chamber defined by the valve chamber bushing 86. Slidable in this bushing and coacting with a seat formed therein to receive it, is a slide valve 87 having a cavity 88. A port 89 leads from the space to the right of the piston 74.

In the upper position of valve 87 the cavity 88 connects passage 89 with exhaust port 91, but when the valve 87 is in its lowermost position the cavity 88 connects the port 89 and consequently the space to the right of the piston 74 with the port 92 which is connected by passage 93 with the chamber 62, and consequently with the emergency port 53. The valve 87 is confined between collars on a stem 94 which is connected at its upper end to a flexible diaphragm 95 which is clamped between the housing 85 and a cap 96. At its lower end the stem 94 is connected to a smaller diaphragm 97 clamped between the housing 85 and a cap 98. The cap 98 is vented to atmosphere at 99 so that the lower face of diaphragm 97 is always subject to atmospheric pressure. The valve chamber, that is, the space between the diaphragms 95 and 97, is always subject to supplemental reservoir pressure which is communicated to it by a branch of the passage 45.

A branch of passage 93 leads through a choke 101 to a port 102 in a cap 103 bolted to the housing 85. This cap serves as a seat for a rotary valve 106 which is subject on its rear face to supplemental reservoir pressure acting in the space between the diaphragms 95 and 97. The valve is further seated by a coil compression spring 107. The seat for the rotary valve 106 is provided in addition to the port 102 with a port 108 leading to the space within cap 96 and above diaphragm 95, a port 109 leading to atmosphere, and a port 111 which leads by way of passage 112 to a closed chamber 113 which is formed within the lower case 17 and projects therefrom into space 52 in the body 18 of the triple valve.

For single stage operation (Fig. 6) the rotary valve 106 is turned by means of handle 114 to a position in which a through port 115 connects the space between diaphragms 95 and 97 with the space within cap 96 and above diaphragm 95. Under these conditions the space above diaphragm 95 is at supplemental reservoir pressure. Consequently the pressures on diaphragm 95 are balanced, while the smaller diaphragm 97 is subject to supplemental reservoir pressure on its upper face and atmospheric pressure on its lower face. It follows that stem 94 moves downward, closing exhaust port 91 and connecting the space to the right of piston 74 with emergency port 53 by way of passage 93, and passage 61. From this it follows that piston 74 will be held permanently to the left and the valve 65 will be held permanently open throughout emergency operation. Consequently, with the valve 106 turned to the position shown in Fig. 6, single stage build up will be had.

For two stage build up, the valve 106 is turned to the position shown in Fig. 5, in which a loop port 116 connects the port 108 with the atmospheric port 109. Consequently the space within cap 96 is subject to atmospheric pressure. It follows that the outer sides of the diaphragms 95 and 97 are both subject to atmospheric pressure while the inner sides of the two diaphragms are subject to supplemental reservoir pressure.

Since the diaphragm 95 is larger than the diaphragm 97, the stem 94 moves to its upper limit of motion. Valve 87 then connects port 89 with the exhaust port 91. Consequently the right hand side of change-over piston 74 is constantly subject to atmospheric pressure. In the first stage of an application the valve 65 is open and free flow to the brake cylinder occurs, but when brake cylinder pressure reaches a definite value sufficient to start piston 74 to the right, the whole area of the piston 74 is subject to brake cylinder pressure and the piston 74 moves suddenly to its right hand limit of motion. This permits valve 65 to close, and thereafter flow to the brake cylinder is limited to the capacity of the choke in cap 67. This condition persists throughout the remainder of the brake application.

If three stage build up is desired, the valve 106 is rotated to the position shown in Fig. 7, in which a loop port 117 connects the chamber port 111 with the ports 102 and 108, the port 117 being provided with an extension 118 to embrace both the last named ports. The effect is to connect the space within the cap 96 and above the diaphragm 95 freely with the chamber 113, and at the same time to connect these two with the emergency port 53 by way of passage 61, chamber 62, passage 93, and choke 101. Choke 101 interposes a time factor for the development of pressure in the chamber 113 by flow from the emergency port 53.

Since the port 53 is connected with the brake cylinder, in release position, it will then be at atmospheric pressure. Consequently, in the first portion of an emergency application the piston 94 will be in the upper position (see Fig. 5) and will remain there while the piston 74 goes through the operations described with reference to two stage build up. Thus there will be a sudden rise of pressure in the brake cylinder, followed by a slow build up. This will persist until the pressure in chamber 113 develops to a point at which a total differential pressure acting downward on the valve stem 94 through the differential diaphragms 95 and 97, will cause the stem 94 to shift the valve 87 downward. The first effect is to cut off the atmospheric connection on the right hand side of piston 74 and then to connect the space to the right of the piston 74 by way of passages 93 and 61 with the emergency port 53. When this occurs the pressure fluid from the emergency port and the spring 75 will immediately shift the piston 74 to its left hand position, reopening the valve 65 and restoring free flow to the brake cylinder.

It follows that the handle 114 has three characteristically different positions, and may be set to give any one of the three different pressure build up characteristics in the brake cylinder.

The change over valve mechanism, particularly the valve 65 and piston 74, form the subject matter of prior applications and are not claimed herein except in combination with the controlling valve mechanism mounted in the body 85 or its equivalent.

The invention is not restricted to the specific triple valve herein shown, nor to use with a triple valve which controls flow from two reservoirs. The structure of the triple valve has been simplified as far as possible, and I recognize that the inclusion of various special functions well known in the triple valve art is possible.

What is claimed is,—

1. The combination of a valve controlling the flow of air from a triple valve to a brake cylinder, said valve being normally open and being arranged to be moved to flow restricting position by the rise of brake cylinder pressure before this attains its full value; means including a fluid pressure actuated abutment for returning said valve to its normal open position; a timing chamber; pressure actuated valve means for admitting and exhausting pressure fluid to and from said abutment; and manually set means for controlling said pressure actuated means and having three positions, in the first of which it subjects said abutment to fluid pressure, in the second of which it affords an exhaust from said abutment, and in the third of which it places said pressure actuated means and said timing chamber in restricted communication with the brake cylinder port of said triple valve.

2. A mechanism for controlling the development of brake cylinder pressure comprising in combination a valve shiftable between two positions, in one of which it permits free flow to the brake cylinder and in the second of which it restricts such flow; means responsive to rising brake cylinder pressure and including a movable abutment for causing shifting of said valve from the first to the second position; means for variably loading said abutment in opposition to brake cylinder pressure, to render the latter effective or ineffective to shift said responsive means; and manually set means for controlling said variable loading means and having one position in which the abutment is heavily loaded and another in which it is lightly loaded.

3. A mechanism for controlling the development of brake cylinder pressure comprising in combination a valve shiftable between two positions, in one of which it permits free flow to the brake cylinder and in the second of which it restricts such flow; means responsive to rising brake cylinder pressure and including a movable abutment for causing shifting of said valve from the first to the second named position; means for variably loading said abutment in opposition to brake cylinder pressure to render the latter effective or ineffective to shift said responsive means; a timing chamber; means operable by the charging thereof to control said loading means; and manually set valve means serving to control said variable loading means and the charging of said chamber, and having one position in which the abutment is heavily loaded, another in which it is lightly loaded, and a third in which the timing chamber is connected to be charged at a restricted rate by air flowing toward the brake cylinder.

4. A valve mechanism for controlling the rate of development of brake cylinder pressure, comprising in combination, a valve shiftable between two positions, in one of which it permits free flow, and in the other of which it permits restricted flow to the brake cylinder; an abutment subject in one direction to brake cylinder pressure and operatively related to said valve; a second valve controlling pressure acting on said abutment in opposition to brake cylinder pressure and shiftable between two positions, in one of which it subjects the abutment to a pressure sufficient to overpower maximum brake cylinder pressure, and in the other of which it subjects the abutment to a lower pressure; and manually controlled motor means adjustable to hold the last named valve in either of said positions at will.

5. A valve mechanism for controlling the rate of development of brake cylinder pressure, comprising in combination, a valve shiftable between two positions, in one of which it permits free flow, and in the other of which it permits restricted flow to the brake cylinder; an abutment subject in one direction to brake cylinder pressure and operatively connected with said valve; a second valve controlling pressure acting on said abutment in opposition to brake cylinder pressure and shiftable between two positions, in one of which it admits pressure fluid against the abutment to establish a pressure sufficient to overpower maximum brake cylinder pressure, and in the other of which it opens an exhaust; and manually controlled motor means adjustable to hold the last named valve in either of said positions at will, or to cause it to shift from one to the other after a definite time interval from the commencement of flow to the brake cylinder.

6. The combination of a valve controlling flow to a brake cylinder and shiftable between a restricting and a non-restricting position; an abutment subject in one direction to brake cylinder pressure and adapted to control said valve; means shiftable between two positions, in one of which it admits pressure fluid against said abutment to establish an opposing pressure sufficient to overpower brake cylinder pressure, and in the other of which it opens an exhaust; a pressure motor for actuating said shiftable means; and a valve manually shiftable between two positions, in one of which it subjects the pressure motor to pressure, and in another vents the pressure motor.

7. The combination of a valve controlling flow to a brake cylinder and shiftable between a restricting and a non-restricting position; an abutment subject in one direction to brake cylinder pressure and adapted to control said valve; means shiftable between two positions in one of which it admits pressure fluid against said abutment to establish an opposing pressure overpowering brake cylinder pressure, and in the other of which it opens an exhaust; a pressure motor for actuating said shiftable means; a timing chamber; and a valve manually shiftable between three positions, in one of which it subjects the pressure motor to pressure, in another vents the pressure motor, and in a third connects the pressure motor and timing chamber with the flow passage leading to brake cylinder.

8. A brake cylinder pressure build up delay mechanism comprising in combination a valve controlling the rate of flow from the triple valve to the brake cylinder; two abutments, one of which is operatively related to said valve to actuate the same and is subject in one direction to brake cylinder pressure, and the other of which controls pressure acting on the first in opposition to brake cylinder pressure; and manually set means for controlling the pressure on the second abutment.

9. A brake cylinder pressure build up delay mechanism comprising in combination a valve controlling the rate of flow from the triple valve to the brake cylinder; two abutments, one of which is operatively related to said valve to actuate the same and is subject in one direction to brake cylinder pressure, and the other of which controls pressure acting on the first in opposition to brake cylinder pressure; a timing chamber; and a manually set valve which in one position admits pressure fluid against said second abutment, in a second position vents said pressure fluid, and in a third position places said timing chamber and second abutment in restricted communication with the flow passage leading to brake cylinder.

10. In a device for controlling the rate of development of brake cylinder pressure, the combination of a flow controlling valve having a free flow position and a position in which it restricts flow; an abutment subject in one direction to brake cylinder pressure and arranged to control said valve; a slide valve having an admission position and an exhaust position and controlling pressure acting on said abutment in opposition to brake cylinder pressure; a pressure chamber in which said slide valve is mounted, said chamber being closed at its ends by two shiftable abutments of differential areas connected with each other and with said slide valve; a timing chamber; and a manually adjustable valve controlling the pressure acting on the outer face of one of said differential abutments, said valve having three positions, in one of which it subjects said abutment to pressure, in another of which it exhausts said pressure, and in the third of which it subjects said abutment to pressure developed in said timing chamber by restricted flow thereto of pressure fluid flowing toward the flow controlling valve.

11. The combination of a flow controlling valve having a free flow position and a flow restricting position; a movable abutment arranged to control said flow controlling valve and subject to brake cylinder pressure acting in a direction to shift said valve to flow restricting position; and a controlling mechanism including a manually set valve and a timing chamber, said mechanism being manually adjustable to three positions, in one of which said abutment is heavily loaded by fluid pressure in opposition to brake cylinder pressure, in the second of which it is less heavily loaded, and in the third of which the timing chamber is connected to be charged at a restricted rate by air flowing toward said flow controlling valve, and functions to produce a delayed increase of said loading.

CHARLES A. CAMPBELL.